Dec. 14, 1971   P. EITEL   3,626,655
METHOD FOR THE CONTINUOUS MANUFACTURE OF EVACUATED
PACKAGES AND APPARATUS FOR CARRYING OUT
THE AFOREMENTIONED METHOD
Filed June 2, 1970   5 Sheets-Sheet 4

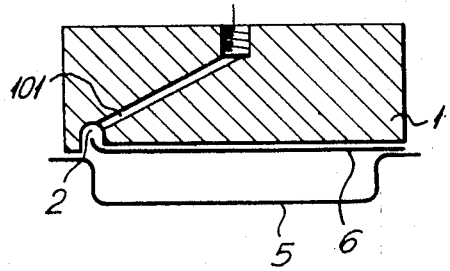
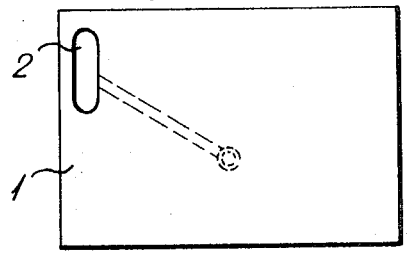
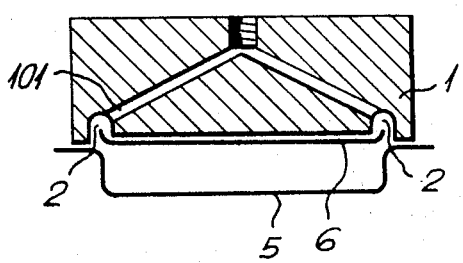
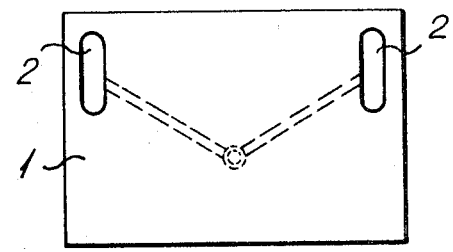
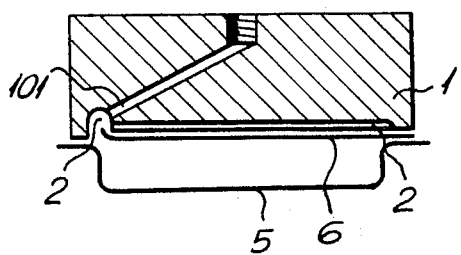
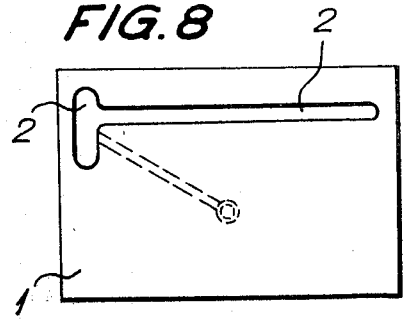
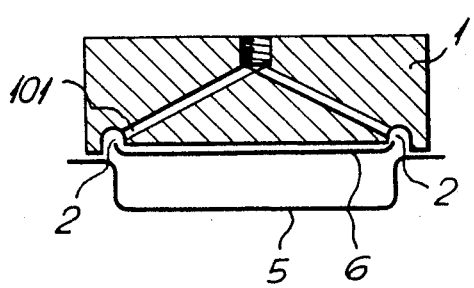
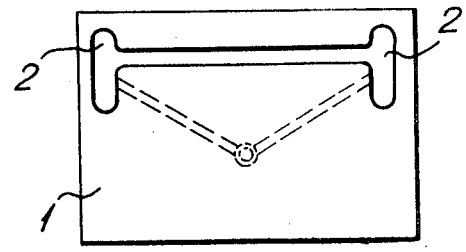

United States Patent Office 3,626,655
Patented Dec. 14, 1971

3,626,655
METHOD FOR THE CONTINUOUS MANUFACTURE OF EVACUATED PACKAGES AND APPARATUS FOR CARRYING OUT THE AFOREMENTIONED METHOD
Paul Eitel, Reiden, Switzerland, assignor to
Tourpac AG, Zug, Switzerland
Filed June 2, 1970, Ser. No. 42,779
Claims priority, application Switzerland, June 19, 1969,
9,363/69
Int. Cl. B65b 31/02
U.S. Cl. 53—22 A
20 Claims

ABSTRACT OF THE DISCLOSURE

A method and apparatus for the continuous evacuation and sealing of successively filled packages formed of two foil webs sealed at their periphery with one another and between which there is contained the package fill. According to the invention, the lower web is filled at spaced locations along its length with the material to be packaged and is guided beneath the upper web. The upper web moves past a vacuum beam and by virtue of the vacuum prevailing thereat is raised into a depression or cavity of such vacuum beam. As a result an opening is formed between the lower and the upper webs through which the vacuum acts upon the surroundings of the material to be packaged. Furthermore, due to the existence of the vacuum the upper and lower webs are pressed against the vacuum beam and one another in such a fashion that they are sealed with respect to the ambient air or surrounding region and only communicate with the vacuum of the vacuum beam by virtue of the aforementioned opening, whereby the hollow space between the webs surrounding the material to be packaged is evacuated. Then the evacuated package is sealed at its periphery.

BACKGROUND OF THE INVENTION

The present invention broadly relates to the packaging art and, more specifically, deals with an improved method for the continuous production of evacuated packages and also relates to an improved apparatus for the performance of the aforementioned method.

Different packaging techniques have become known to the art by means of which deformable and heat-sealable foils can be processed through utilization of the known deep-drawing technique. The package fill is applied to the formed lower carrier or supporting foil of the package, and typically by employing two separate sealing operations the package is hermetically closed. These packages can thereafter be separated from one another in conventional fashion and removed from the packaging forming equipment.

Now, the known techniques of the prior art possess the drawback that the welding operation, that is to say the sealing operation, by virtue of the required hermetically sealed vacuum compartment in which the sealing step occurs, requires such sealing operation to be carried out with stationary heat-sealing or welding elements within this compartment. Apart from the attendant complicated equipment construction, there is additionally necessitated extremely sensitive and expensive control components, all of whose operations must occur in succession. This procedure is not only time-consuming, but it also appreciably reduces the production capacity.

SUMMARY OF THE INVENTION

Accordingly, it is a primary object of the present invention to provide an improved method of and apparatus for the fabrication of evacuated packages in an extremely efficient, reliable and economical manner, without experiencing the aforementioned drawbacks associated with prior art techniques and constructions.

Still another more specific object of the present invention relates to an improved method of and apparatus for the fabrication of evacuated packages with equipment which is relatively simple in design, extremely economical to manufacture, does not require complicated and expensive accessory controls or auxiliary equipment, is highly reliable in operation, not readily subject to breakdown, and easy to service.

Another, extremely important object of the present invention relates to an improved method and apparatus for the production of evacuated packages in which the production capacity is not negatively impaired by time-consuming operations of the aforementioned type which are experienced with prior art equipment and techniques, and further, wherein the seal between both foil webs between which there is enclosed the package fill does not take place in a stationary compartment system, rather the negative pressure evacuating the space or compartment between the foils is advantageously employed in conjunction with the extremely acting atmospheric overpressure to unite both of these foils with one another.

Now, in order to implement these and still further objects of the invention, which will become more readily apparent as the description proceeds, the inventive method for the continuous evacuation and sealing of successively filled packages consisting of two foil webs sealed with one another at their periphery and between which there is contained the package fill, is manifested by the features that the lower web is filled with package fill at spaced locations thereof and guided beneath the upper web. The upper web is moved past and below a vacuum beam or the like and by virtue of the vacuum conditions prevailing within the vacuum beam is raised into a depression or cavity at such vacuum beam. Consequently, there is formed an opening between the lower and upper foil webs through which the vacuum can act upon the area surrounding the package fill. Furthermore, due to the action of the vacuum the upper and lower foil webs are applied to the vacuum beam and against one another in such a fashion that they are sealed with respect to the surroundings and only communicate via the aforementioned opening with the vacuum prevailing in the vacuum beam. As a result, the hollow space about the package fill is evacuated. The evacuated package is then sealed about its periphery.

As a general rule, the upper foil web is shortened in its horizontal transverse dimension due to its being raised into the cavity or depression provided at the vacuum beam. Hence, the vacuum acting at the cavity can also become effective beneath the upper foil web.

The cavity can extend predominantly parallel to the direction of food or advance of the foil webs but can also extend transverse thereto. It is particularly advantageous to employ a cavity construction formed of a cavity portion extending parallel to the direction of advance of the webs and a cavity portion extending transverse thereto and intersecting the firstmentioned cavity portion.

Dependng upon the placement of the components of the equipment and their construction it is possible to position the aforementioned opening between both webs and through which the vacuum acts upon the surrounding region of the package fill either at the edge or in a central region of the foil. If individual successively formed packages are fabricated, then the one or the other marginal portion, possibly both marginal portions, of the upper foil web is raised into the cavity or depression. If a plurality of packages are to be fabricated adjacent one another, then it is advantageous if there is raised a central region situated between the packages, whereby, then, either a number of adjacently arranged upper foils serve as the upper web means or, however, the upper foil is pierced or otherwise provided with an interrupted construction, for instance a slot, at the region where this foil is raised. Furthermore, transversely extending openings can be particularly suitable for this puropse if care is taken to ensure that they are, in each instance, between the transverse seams of successive packages as soon as they are sealed.

The lower foil web is advantageously provided with a trough or cavity for the package fill by deep-drawing, whereas the upper web advantageously is delivered without being formed. It is possible to carry out the method in the following manner: the lower web is pre-formed in suitable molds or cavities by suction, these molds being arranged for instance at an appropriately constructed conveyor band or drum member, for example as described in the commonly assigned, co-pending United States application, Ser. No. 801,039 of Herbert Limmer, filed Feb. 20, 1969, now Pat. No. 3,557,517, issued Jan. 26, 1971 and entitled "Method for the Continuous Production of Evacuated Packages and Apparatus for the Performance of the Aforesaid Method." The package fill is introduced into the depressions of the formed foil web. This web travels with its fill contents beneath the superimposed guided upper foil web. Both webs are then passed beneath a vacuum beam which at its lower side or face is eqiupped with the aforementioned cavity or depression raising the upper foil web. To prevent the lower foil web from also being raised it can be appropriately guided. It is also possible to provide holddown means in the depression or cavity of the vacuum beam for holding down the lower fail web and/or the package fill. If a number of packages are fabricated next to one another, then the upper web is advantageously slotted at a suitable separation location. Then, if this slotted location enters into the cavity of the vacuum beam, there appears an opening through which the vacuum can act upon the interior of the package. By virtue of the suction within the package and the surrounding pressure about the package the lower foil web is also pressed upwardly and therefore against the upper foil web. Consequently, a good seal is provided, allowing for sufficient evacuation of the package.

Furthermore, it is possible to intermittently flush the package with a suitable gas, so-called gasification, necessary for instance to package cheeses, by way of example, so that the contents of the package retain their appearance and taste. Gasification can also only then take place directly prior to sealing and can, as the case may be, with prior interruption of the evacuation process if the package should remain filled with such gas. Both of the webs which are placed against one another, and which have been evacuated, are then continuously sealed at both edges lengthwise and at two transverse strip portions, through perforance of a suitable heat-sealing or welding operation with the aid of appropriate heat-sealing devices. To this end, there can be employed suitable heat-sealing rollers which can carry out quite effectively the sealing of the package. The entire operation can take place with continuous advance of the foil webs, so that one package after the other is processed, without requiring the otherwise extremely cumbersome intermittent mode of operation prevailing in many forms of prior art equipment. Furthermore, the desired separation of the packages from one another can likewise be performed continuously.

The preferred embodiment of inventive apparatus utilized to advantage for performing the aforementioned inventive packaging method will be seen to comprise means for advancing the upper and the lower webs, and further, possesses a vacuum beam member or similar vacuum device extending transverse to the direction of advance of these webs. This vacuum beam member possesses at least one cavity or depression, communicating with a suitable vacuum source, this cavity being located at the underside of the vacuum beam member confronting both webs. Additionally, heat-sealing members for sealing the edges of the package are also provided.

As already briefly mentioned in connection with the description of the inventive method, the aforementioned cavity can extend parallel, transverse or in both directions with respect to the direction of feed or advance of the foil webs. This cavity advantageously contains means for holding down the package fill and/or the lower foil web. Furthermore, it can be equipped at least with one infeed channel for gasification of the package fill, advantageously extending through the holddown means. Further, the inventive equipment can be equipped with control means enabling intermittent gasification and, if desired, an intermittent interruption of the evacuation at least during a portion of the gasification time.

The vacuum beam should advantageously span over the entire foil width and at least an overlapping length of the length of the finished package mass. The lower foil is advantageously guided by means of an edge or marginal support mechanism, for instance a screw or holder chain device. The dimensions of the vacuum beam should be accommodated to such. Since the package or the foil webs are subjected to the ambient pressure at the side facing away from the vacuum beam, the upper foil is initially sucked into the mentioned cavity, so that, as related during the discussion of the inventive method, an opening appears through which the vacuum now can also act upon the package fill and the lower web. Hence, air is sucked out of the hollow space between both foil webs so that the surrounding or ambient pressure presses these foil webs against one another. Through the use of suitable heat-sealing means, for instance a heating roller, the package is sealed or welded. In so doing, a heat-sealing roller can undertake both the application of the lengthwise welding or heat-sealing seam as well as also the transverse seams. Generally this occurs directly after departure of the package from below the vacuum beam. If the contents of the package should have gas applied thereto, then this can take place in any suitable fashion prior to heat-sealing.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 3 to 21 schematically show details of various structural embodiments of vacuum beam member in cross-section and plan view, respectively, and which can be successfully utilized in the apparatus constructions of FIGS. 1 and 2.

DETAILED DESCRIPTION OF THE PREFERRED EMBODIMENTS

Figure 1:
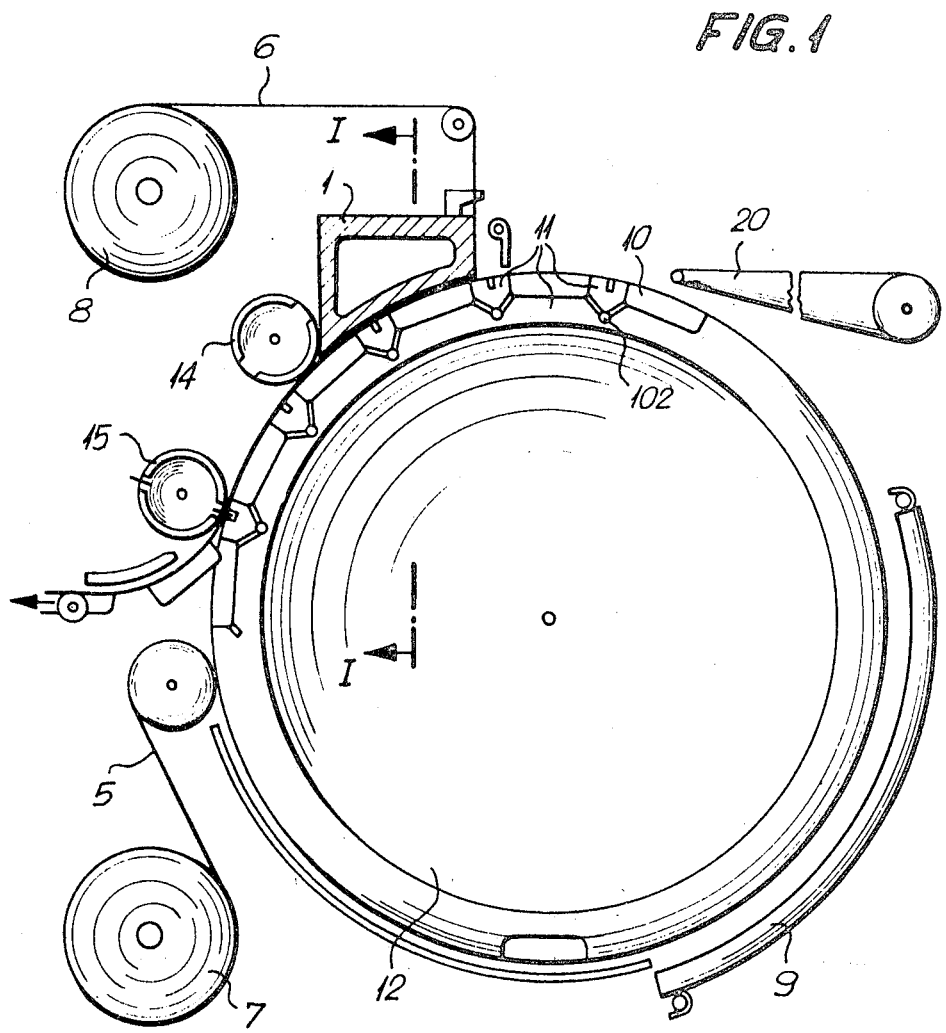
FIG. 1 is a schematic side view, partially in section, of a first embodiment of inventive package-forming apparatus.
Figure 2:
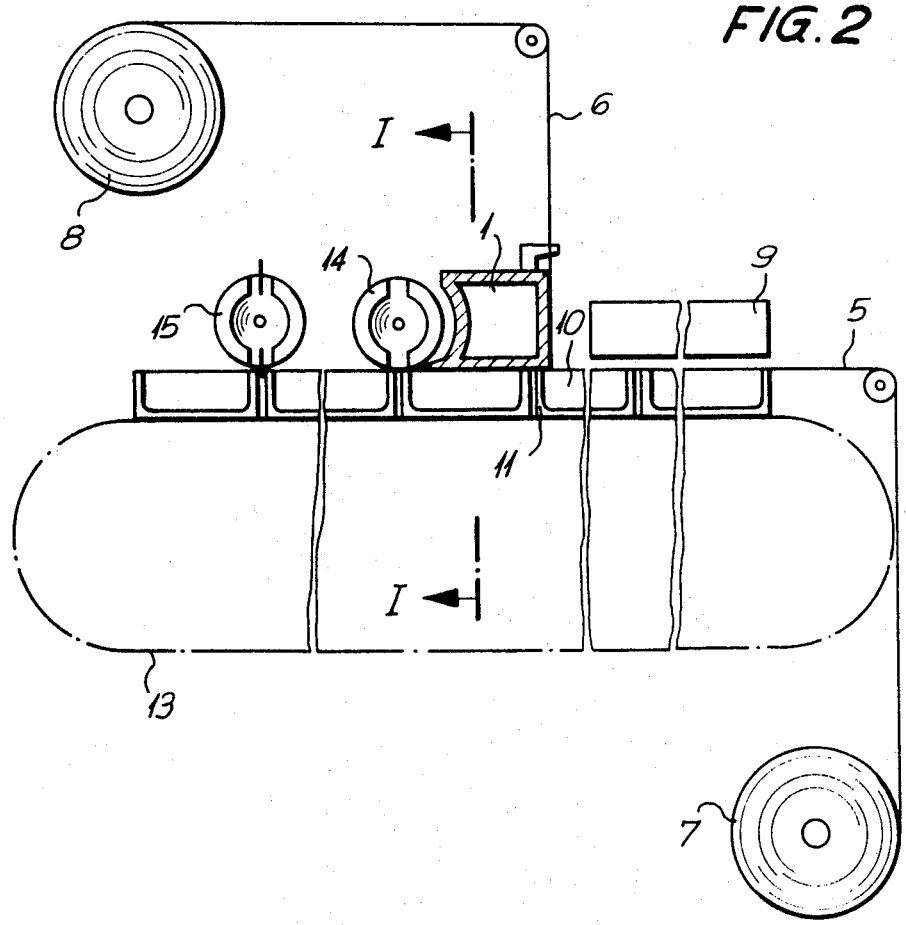
FIG. 2 is a schematic side view, also partly in section, similar to the showing of FIG. 1, but of a further embodiment of inventive package-forming apparatus.
Figure 13:
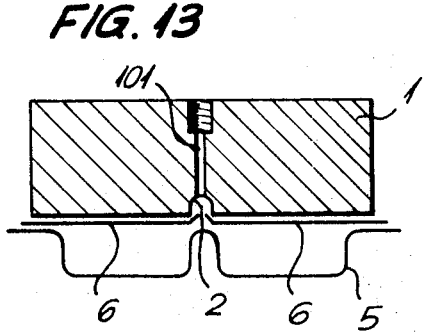
Figure 14:
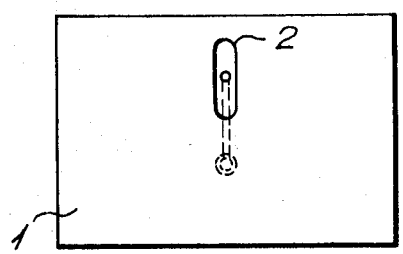
Figure 15:
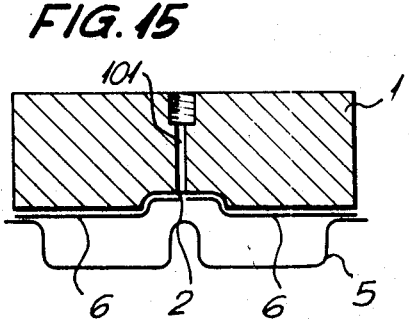
Figure 16:
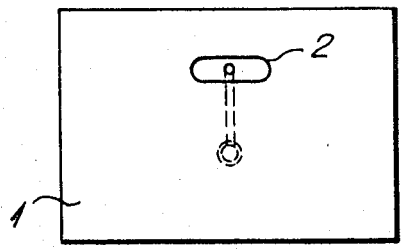
Figure 17:
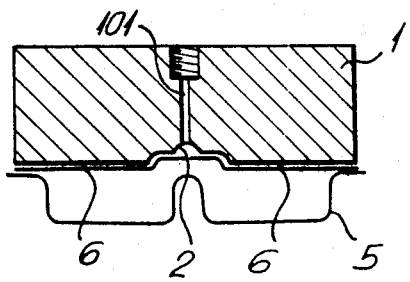
Figure 18:
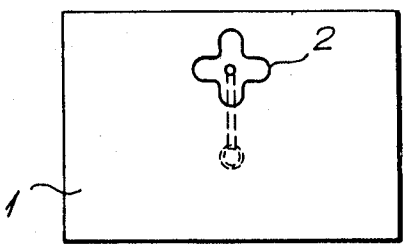

Describing now the drawings, the exemplary embodiments of packaging apparatus depicted in FIGS. 1 and 2, respectively, each will be seen to be equipped with a so-called vacuum beam member 1 which is provided at its lower face or underside with a cavity or depression 2, more fully to be described in conjunction with FIGS. 3 to 21 respectively, depicting various forms of such vacuum beam member 1. Moreover, each of the cavities 2 of the various forms of vacuum beam member 1 shown throughout the figures may communicate via a channel or bore 101 with a suitable vacuum source 100, as shown in FIG. 3, and omitted from the other figures in order to simplify illustration. However, it should be understood that a similar vacuum source 100 can be provided for the other vacuum beam constructions shown in FIGS. 5 to 21. Furthermore, as best observed by referring to FIGS. 3 and 4, the cavity 2 can be positioned to extend lengthwise along one side of the underface of the vacuum beam member 1, that is to say in the direction of feed or advance of the foil webs 5, 6, or as shown in FIGS. 5 and 6 can extend lengthwise along both sides of its vacuum beam member 1, or else as shown in FIGS. 7, 8 can extend along one side in the lengthwise direction and have a portion extending transverse thereto and intersecting therewith, or furthermore, as shown in FIGS. 9 and 10, this cavity 2 can extend along both sides of the vacuum beam member 1 and have a transversely extending interconnecting portion. Moreover, as best shown by referring to FIGS. 11 and 12 as well as FIGS. 13 and 14, the vacuum beam cavity 2 can also extend in the lengthwise direction of the underface of the vacuum beam member 1 with respect to the direction of travel of the foil webs 5, 6 and be substantially centrally disposed at such underface, or, however, as best shown in FIGS. 15 and 16, such cavity can similarly be substantially centrally disposed at the underface of the vacuum beam member 1, but this time extend transversely, with respect to the direction of feed of the webs 5, 6. Continuing, it is mentioned that at the present time there is preferred the cross-shaped cavity construction 2 of the embodiments of vacuum beam member 1 shown in FIGS. 17, 18 and 19, 20 respectively, when a number of packages (in this case two packages) are simultaneously processed adjacent one another.

Now the vacuum beam member 1, both for the packaging equipment shown in FIG. 1 as well as that of FIG. 2, extendse substantially transverse to the direction of feed or advance of the foil webs 5 and 6 from which the packages are produced in succession in continuous fashion. These foil webs 5 and 6 are advantageously appropriately flexible, can be heat-sealed and, if desired, imperivous to light. Foil webs meeting these requirements and suitable for the formation of such packages are well known in the art.

Each of the foil webs 5 and 6 are payed-off from their corresponding supply rolls 7 and 8, respectively. The foil web which is located lowermost on the equipment, conveniently referred to as the lower foil web 5, is heated by a suitable heating element 9 as it advances towards the vacuum beam member 1, this web becoming plastic and through the action of a negative pressure applied, for instance, to the channel system 102 of the drum member 12 of the equipment of FIG. 1, is deep-drawn into suitably configured recesses 10 of the molds 11 provided at either the drum member 12 (FIG. 1) or the endless conveyor structure 13 (FIG. 2). These molds 11 can be directly applied to the drum member 12 of FIG. 1 or the conveyor band 13 of FIG. 2, a drum member 12 and conveyor band 13 being continuously moved. Thereafter, the package fill is deposited into the recesses or mold cavities 10 of the molds 11 covered by the foil 5, preformed as explained above, the deposition of the fill material occurring by any suitable filling device, such as the filling mechanism 20 of FIG. 1 for instance. The foil web 5 charged with the package fill now approaches closer to the vacuum beam member 1, and directly in front of the vacuum beam member 1 there is then placed upon the lower foil web 5 the upper foil web 6.

If individual packages are to be fabricated, then, it is possible to use a vacuum beam member constructed in accordance with any of the embodiments of FIGS. 3 to 10. Depending upon which type of vacuum beam 1 is utilized, one marginal edge or both marginal edges of the upper foil web 6 are lifted into the associated cavity or depression 2 of the vacuum beam member, so that, as shown in these various figures, the prevailing vacuum can act upon the space or region between the foils 5 and 6 and can evacuate such space. Furthermore, due to this action of the marginal edge or edges of the lower foil web size is pressed against the underside or face of the vacuum beam 1. Due to the continuous advancing movement the edge portions of the upper foil webs 6 are pressed at the region of the end of the vacuum beam cavity 2 against the marginal edge of the lower foil web 5, these marginal portions of the webs which contact one another and extend in lengthwise direction as well as transverse strip portions of the foil webs 5, 6 being heat-sealed to one another by means of a suitable heat-sealing roller 14. The packages which travel further are then separated by the cutter roller mechanism 15 and are finally ejected from the machine. Mechanism for heat-sealing the foils as well as for cutting same into individual packages are well known in the packaging art, and, in fact, further details thereof have been set forth in the aforementioned copending, commonly assigned U.S. application previously mentioned herein.

Figure 11:
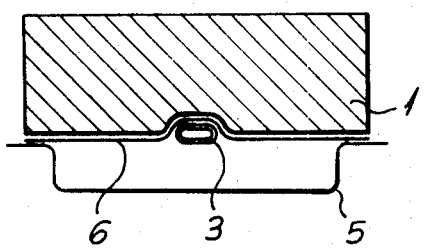
Figure 12:
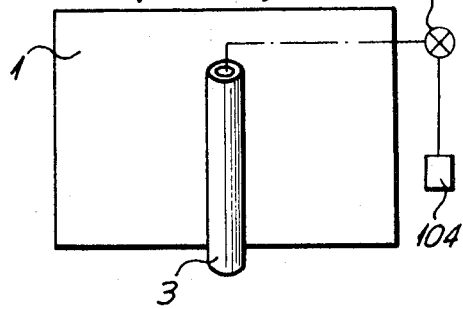

Basically, the same procedure occurs when using the vacuum beam 1 of FIGS. 11, 12, but here, however, a vacuum tube or pipe 3 is placed between the foil webs 5 and 6 and provides the requisite evacuation of the package, whereas the cavity, omitted for convenience in illustration from such figures, only has the function of raising the upper foil web 6. Furthermore, by making use of appropriate mechanism, such as the schematically depicted valve structure 103 and the control device 104, it is possible to make use of the tube member 3 so that intermittently there can occur a gasification of the interior of the package together with the evacuation process. Moreover, if it is desired the gasification of the package contents can occur after evacuation has been completed. Quite obviously, similar gasification equipment can be provided for any of the other embodiments of vacuum beam member disclosed herein, the gas for instance being admitted into the package via the evacuation conduit 101 provided at the corresponding vacuum beam.

If it is desired to fabricate two packages adjacent one another, then it is advantageous to employ a vacuum beam member 1 of the type depicted in FIGS. 13 to 20, respectively. In such case, the upper foil is provided with an opening, such as a slot, at the region of the cavity 2, or else there are employed two upper foil webs 6 disposed adjacent one another so that as best shown in these figures, through the application of the negative pressure or suction and the raising of the upper foil 6 into the mold or cavity 2 the slot is opened so that the vacuum can act upon the interior of the package. Naturally when there are employed two upper foil webs 6 disposed adjacent one another there is provided a natural opening between the confronting marginal edges or regions. Furthermore, the structure of vacuum beam depicted in FIGS. 17, 18 and 19, 20, namely the cross-shaped type cavity structure, is especially advantageous. The heat-sealing, package-separation, and ejection operations can all occur in a manner previously considered.

Figure 19:
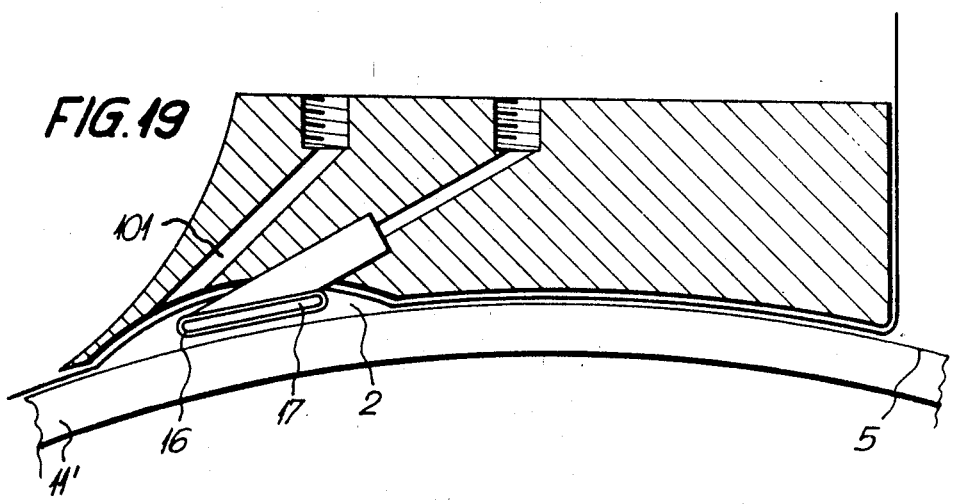
Figure 20:
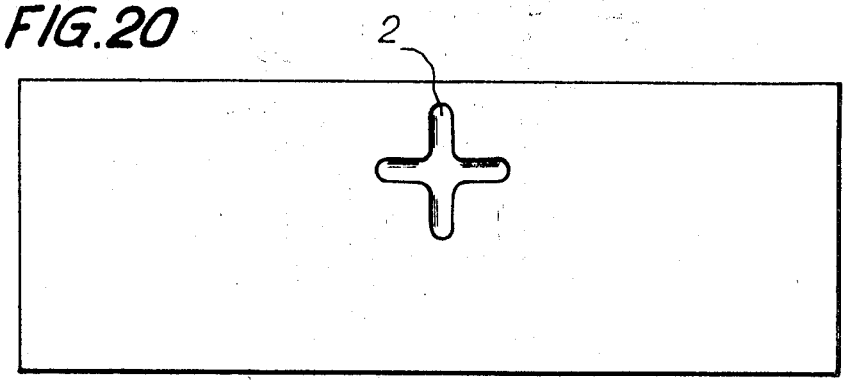
Figure 21:
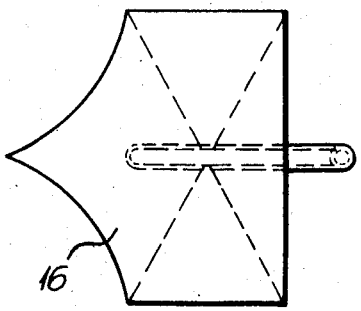

From FIG. 19 there will be recognized, apart from the vacuum beam 1 and the foils 5 and 6 as well as the vacuum beam cavity or depression 2, also the holddown member 16. In the present illustration, such holddown member 16 is hollow and constructed such that it opens into the interior face 11 of the packages. The hollow portion or openings 17 of the holddown member 16 communicates with a suitable conduit (not shown) for the admission of the gasification agent or gas. Just as was the case with the embodiment of vacuum beam member 1 of FIGS. 11 and 12, here also it is possible to provide valve structure and control mechanism for the purposes explained heretofore. Hence, the control can be undertaken such that either together with the evacuation process or after termnation of evacuation the contents of the package receive the gas, which for certain package fill, for instance cheeses, can be necessary. FIG. 21 is a plan view of a portion of the holddown member 16; at its upper edge there is clearly recognized the nozzle portion 17 for the infeed of the gas agent.

While there is shown and described present preferred embodiments of the invention, it is to be distinctly understood that the invention is not limited thereto but may be otherwise variously embodied and practiced within the scope of the following claims. Accordingly,

What is claimed is:

1. A method for the continuous evacuation and sealing of successively filled packages formed of two foil webs sealed at their periphery with one another and between which there is contained the package fill, comprising the steps of: advancing a lower foil web along a predetermined path of travel, filling such lower foil web at spaced locations along its length with the material to be packaged, guiding said lower foil web beneath an upper foil web, displacing said upper foil web beneath and past a vacuum beam, creating a negative pressure at the vacuum beam and by virtue of the vacuum prevailing thereat raising said upper foil web into a cavity of said vacuum beam, and thereby form an opening between the lower and upper foil webs through which such vacuum acts upon the surroundings of the package fill contained therebetween, pressing the upper and lower foil webs due to the action of such vacuum against the vacuum beam and against one another such that these foil webs are closed with respect to the ambient air and only communicate with the vacuum of the vacuum beam by virtue of the aforementioned opening whereby the hollow space between the foil webs surrounding the material to be packaged is evacuated, then sealing the evacuated package formed of these foil webs about its periphery.

2. A method as defined in claim 1, wherein the step of raising the upper foil web into the cavity of the vacuum beam is undertaken while at least partially shortening its horizontal transverse dimension.

3. The method as defined in claim 2, wherein the cavity of the vacuum beam raises the marginal portions of the upper foil web and thus forms said opening between the marginal portions of the upper and the lower foil webs.

4. The method as defined in claim 2, further including the step of providing the upper foil web with through passage means, and wherein the cavity of the vacuum beam raises a portion of the upper foil web located between the marginal edges of such upper foil web such that there is a flow communication via said throughpassage means between the vacuum prevailing at the vacuum beam and the space between the lower and upper foil webs.

5. The method as defined in claim 4, and further including the steps of simultaneously evacuating a number of adjacently arranged packages formed of foil webs, and the evacuation occurs at least partially by means of the throughpassage means of the upper foil web located between adjacent packages.

6. The method as defined in claim 1, including the steps of providing a plurality of adjacently arranged upper foil webs corresponding in number to the number of adjacently arranged packages which are to be formed, evacuating such number of adjacently arranged packages at the same time, and wherein for purposes of carrying out such evacuation operation at least the marginal regions of two neighboring upper foil webs are raised by the cavity of the vacuum beam to produce the said opening between said marginal portions of both upper foil webs through which the vacuum prevailing at the vacuum beam can act upon the surroundings of the package fill.

7. The method as defined in claim 1, further including the step of holding down the package fill, the lower foil web, or both, in order to prevent penetration therof into the vacuum beam cavity.

8. The method as defined in claim 1, further including the step of applying to the package fill and the interior of the package being formed a gas during evacuation.

9. The method as defined in claim 1, including the steps of applying a gas to the package fill and the interior of the package being formed after evacuation thereof.

10. In an apparatus for the continuous evacuation and sealing of successively filled packages formed of two foil webs sealed at their periphery with one another and between which there is contained the package fill, comprising means for continuously advancing an upper foil web and a lower foil web, vacuum beam means positioned to cooperate with said upper and lower foil webs and extending transverse to the direction of advance of said foil webs, said vacuum beam means being provided with at least one cavity capable of communicating with a source of negative pressure, said vacuum beam cavity being provided at the underside of said vacuum beam means facing both of said foil webs, and sealing means for sealing the edges of the packages being formed from said foil webs.

11. In an apparatus as defined in claim 10, wherein said at least one cavity at the underside of said vacuum beam means is provided at the marginal region of the upper foil web.

12. In an apparatus as defined in claim 10, wherein said at least one cavity provided at the underside of said vacuum beam means extends transverse with respect to the direction of advance of said foil webs.

13. In an apparatus as defined in claim 10, wherein said at least one cavity provided at the underside of said vacuum beam means extends substantially parallel to the direction of advance of said foil webs.

14. In an apparatus as defined in claim 13, wherein said at least one cavity which extends substantially parallel to the direction of advance of said foil webs is located at substantially the central region of the underside of said vacuum beam means.

15. In an apparatus as defined in claim 14, wherein said at least one cavity provided at the underside of said vacuum beam means and extending substantially parallel to the direction of advance of said foil webs includes at least one cavity portion extending transverse thereto and intersecting therewith.

16. In an apparatus as defined in claim 13, wherein said at least one cavity extending parallel to the direction of advance of said foil webs includes at least one cavity portion extending substantially transverse thereto and intersecting therewith.

17. In an apparatus as defined in claim 10, further including holddown means cooperating with said cavity for the purpose of holding down the package fill, the lower foil web, or both, and thus keeping such away from said cavity.

18. In an apparatus as defined in claim 10, further including a gas conduit for applying a gas into said cavity.

19. In an apparatus as defined in claim 18, further including holddown means provided at said cavity, said gas conduit opening into said holddown means.

20. In an apparatus as defined in claim 19, further including valve means and control means in order to intermittently switch-in and switch-out the evacuation of the packages and the application of gas thereinto.

References Cited
UNITED STATES PATENTS 2,840,961   7/1958   Karpowicz _____ 53—22 A
3,061,984   11/1962  Mahaffy _____ 53—22 A TRAVIS S. McGEHEE, Primary Examiner U.S. Cl. X.R.

53—30, 112 A, 184